United States Patent Office 3,271,434
Patented Sept. 6, 1966

3,271,434
PROCESS FOR CONTROLLING THE MELTING POINT OF HARD AND BRITTLE FATS
Wolfgang Baenitz, Witten-Annen, Germany, assignor to Chemische Werke Witten G.m.b.H., Witten (Ruhr), Germany
No Drawing. Filed Aug. 7, 1962, Ser. No. 215,263
Claims priority, application Germany, Feb. 12, 1958, I 14,406
2 Claims. (Cl. 260—410.7)

The present invention is related to a process for the production of hard and brittle fats from saturated fatty acids, and more particularly to a process for the production of such fats in such a manner as to control the melting point thereof during the manufacture thereof. The present application is a continuation-in-part application of application S.N. 792,706, filed February 12, 1959.

Brittle and hard fats are required for a variety of purposes, e.g., in the pharmaceutical and food industries. With the exception of cocoa butter, none of the known natural fats possesses these characteristics, while the so-called modified fats or synthetic fats similarly fall short of the required standards. It is well known to effect hardening of fats by catalytic hydrogenation but while the hydrogenated products, e.g., hydrogenated cocoa fat or palm kernel fat, have an increased melting point of about 35° C., they do not possess the desired hardness and brittleness.

It is known that fats having the desired characteristics hereinbefore mentioned can be obtained by subjecting a free fatty acid derived from a natural fat or oil to hydrogenation and to esterification with a polyhydric alcohol, such as glycerine; these steps being effected in either order. In such known methods, the free fatty acid is preferably employed in the form of a vegetable fat or oil which melts in the region of that desired in the final product and which has been split in the usual manner. The products obtained by the direct hydrogenation of the initial fat or oil are not the same as, indeed, they are markedly softer and less brittle than the products obtained by the above-discussed prior art method.

It is known also to produce hard and brittle fats by esterifying, instead of the fatty acid mixtures obtained by splitting natural fats and subsequent fractional distillation of the split fatty acids, two or more individual fatty acids having an iodine number of less than 5 and having about 18 carbon atoms in the molecule with polyhydric alcohols, such as glycerine, to give two- or poly-acid partial esters containing free hydroxyl groups, preferably in such a manner that there is more than 1 free hydroxyl group for 3 to 20 moles of ester.

In the known processes, the respective melting point of the end product is determined by blending different ingredients to obtain a final product having the desired melting point. The fatty acids used are specifically selected and blended in a special manner to form the fatty acid mixture which is then esterified to produce the desired fats. Other considerations such as toxicity, odor, etc., also must be taken into account when blending the various ingredients if the product is to be used in the pharmaceutical and food industries.

A new approach to the control of the melting point, etc., has now been found, however, which does not involve a blending of ingredients, but effects control of the melting point directly and effectively during manufacture of the fat, i.e., during esterification of the fatty acid or acids, by controlling the amount of excess glycerine used in the esterification process. The method of the present invention contemplates reacting the aforementioned acids with a specified excess amount of glycerine whereby the resultant esterified product has a hydroxyl value of between about 40 and 100, and preferably between 60 and 80, and also has a predetermined melting point determined by the amount of excess glycerine used and consists essentially of tri- and diglycerides.

The new process according to the present invention, accordingly, is directed to the production of hard and brittle fats having a predetermined melting point, especially a minimum melting point, particularly for use as suppository compositions, consisting of at least 90% of a mixture of di- and triglycerides, which may be advantageously prepared by esterifying mixtures of saturated fatty acids having at least 10 carbon atoms and at most 18 carbon atoms in the molecule with excess glycerine. The excess glycerine is used in such a ratio that for 1 mole of fatty acids, 0.378–0.520, preferably 0.425–0.475, mole of glycerine is employed. With the aid of the process according to the present invention, ester mixtures are obtained which consist of at least 90% of tri- and diglycerides of the mixed, saturated fatty acids and have melting points which are within the range of a melting point minimum.

A unique feature of the present invention is in the fact that the brittle and hard fat produced does not completely have its melting point determined by the fatty acid or fatty acid mixtures employed. By utilizing an excess of glycerine, one can considerably control and select a resultant product having a desired melting point although basically there are two main factors influencing the melting point of the fatty acid ester mixtures falling within the range of the present invention. The melting point is, on the one hand, dependent on the melting point of the fatty acid, and, respectively, the fatty acid mixture; and on the other hand, on the quantity of excess glycerine used in the esterification process.

The strong dependence of the melting point of the ester mixture upon the magnitude of the glycerin amount used is obvious, for example, from the following comparison of the molar ratio of glycerine to fatty acid mixture with the rising melting point of the resulting ester mixture, which comparison represents the result of comparative esterifications of one and the same fatty acid quality (basis: refined cocoa-palm kernel fatty acid mixture). The acid number was 252.6, the melting point 35° C.

| Molar ratio of glycerine to fatty acid: | Rising melting point of the ester mixture |
|---|---|
| 0.3333 | 37.1 |
| 0.3357 | 36.1 |
| 0.3478 | 35.7 |
| 0.3662 | 34.4 |
| 0.4019 | 32.9 |
| 0.4435 | 32.1 |
| 0.5009 | 32.4 |
| 0.6627 | 33.9 |

The comparison clearly shows the importance which is to be attributed to the molar ratio of glycerine to fatty acid with regard to the melting point of the ester to be prepared.

The present process also involves the recognition that a melting point minimum is achieved by the mixture of di- and tri-esters when the amount of excess glycerine is between 0.425 and 0.475 moles of glycerine per mole of fatty acid. This minimum is, on the average, between 4 and 8 degrees centigrade below the melting point to be expected for the tri-ester.

The process in accordance with the present invention allows the use of fatty acid mixtures with high melting points without endangering thereby the requirements which are to be expected of the melting point for the final product which, for example, may be a suppository composition. By selecting the amount of glycerine within the aforementioned molar range, it is possible to determine the melting point of the ester mixtures to be prepared. The lowest melting point is attained with the use of glycerine of 0.425–0.475 mole per mole of fatty acid mixture.

When it is considered that hard and brittle fats are required for a variety of uses, particularly in the pharmaceutical and food industries, in which the melting point is of particular importance, it can be appreciated that the simplicity of the present invention, as would appear in hindsight, is only equaled by its economic importance and startling results realized in connection therewith.

The inventive concept of the present invention permits the use of known esterification steps to show an influence on the melting point of the ester products by means of a clear manner of operation by which the quality of the ester product may be easily predicted and varied.

The use of fats of the type with which the present invention is concerned in connection with suppository compositions emphasizes the importance of the aspect of controlling the melting point, since it is a requirement and a prerequisite that suppository base compositions melt within a relatively narrow range of temperatures determined by the temperature of the human body.

Accordingly, a primary object of the present invention is to teach a simple and inexpensive process for producing a hard and brittle fat having a predetermined melting point.

It is another object of the present invention to teach a process for controlling the melting point of hard and brittle fats during the manufacture thereof by controlling the amount of excess glycerine used.

A further object of the present invention is the production of hard and brittle fats, particularly for use as suppository masses, consisting of at least 90% of a mixture of di- and triglycerides prepared by the esterification of saturated fatty acids having from 10 to 18 carbon atoms in the molecule with glycerine in such a ratio that for 1 mole of fatty acid, 0.378–0.520 mole, preferably 0.425–0.475 mole, of glycerine is used in order to produce an ester mixture of minimum melting point.

As saturated fatty acids, preferably lauric acid, myristic acid, palmitic acid or stearic acid are used, which may be employed either alone or in mixture with each other, whereby at least two of the above-named fatty acids must be used for the preparation of the ester mixtures according to the present invention.

The following examples serve to further illustrate the present invention without, however, limiting the same.

*Example I*

1 kg./mole of a fatty acid mixture is obtained by splitting refined palm kernel fatty acid and separating therefrom the fatty acids having less than 12 carbon atoms, hydrogenating the same and distilling. The fatty acid mixture, which has an acid number of 247.5, an iodine number of 1.9 and a melting point of 37.0° C., is esterified with 0.41 kg./mole of glycerine at 210° C. in vacuo in the presence of an esterification catalyst. The esterification is considered to be completed when the acid number has reached a value of below 0.5. The ester is finished and deodorized in the conventional manner and has the following characterizing numbers:

| | |
|---|---|
| Saponification number | 228 |
| Iodine number | 2.1 |
| Hydroxyl number | 50.0 |
| Rising melting point °C | 37.7 |

It is composed of

| | Percent |
|---|---|
| Monoglyceride | 2.9 |
| Diglyceride (calculated) | 35.08 |
| Triglyceride | 61.87 |
| Free glycerine | 0.03 |

*Example II*

A lauric acid-myristic acid fraction, having been obtained by splitting of palm kernel oil and by a suitable distillation, and having an acid number of 264 and a melting point of 40.5° C., is esterified with glycerine. 0.4365 kg./mole glycerine is used for 1 kg./mole of the fatty acid mixture. The esterification takes place in known manner, and the deodorized end product has the following characterizing numbers and composition:

| | |
|---|---|
| Saponification number | 240 |
| Iodine number | Below 1 |
| Hydroxyl number | 79 |
| Rising melting point °C | 34.5 |
| Monoglyceride percent | 7 |
| Diglyceride (calculated) do | 48.5 |
| Triglyceride (calculated) do | 44.5 |
| Free glycerine | Not evident |

*Example III*

A mixture of lauric acid and palmitic acid (having an acid number of 253 and a melting point of 39.4° C.) is esterified wtih such an amount of glycerine that 0.442 kg./mole of glycerine is used for 1 kg./mole of the fatty acid mixture. After finishing, an ester with the following data and the below-indicated composition is yielded:

| | |
|---|---|
| Saponification number | 229 |
| Iodine number | Below 1 |
| Hydroxyl number | 70 |
| Rising melting point °C | 34.3 |
| Monoglyceride percent | 5 |
| Diglyceride (calculated) do | 44 |
| Triglyceride (calculated) do | 51 |
| Free glycerine | Not evident |

*Example IV*

A fatty acid mixture obtained from lauric acid, myristic acid and palmitic acid by correspondingly conducting the distillation, and having an acid number of 244 and a melting point of 39° C., is esterified with such an amount of glycerine that 0.4444 kg./mole of glycerine is used per 1 kg./mole of fatty acid mixture. After subsequent finishing of the crude ester, the following characterizing numbers and the below-indicated composition were found:

| | |
|---|---|
| Saponification number | 228 |
| Iodine number | Below 1 |
| Hydroxyl number | 73 |
| Rising melting point °C | 35.0 |
| Monoglyceride percent | 5.5 |
| Diglyceride (calculated) do | 41.5 |
| Triglyceride (calculated) do | 53.0 |
| Free glycerine do | 0.008 |

It will be apparent that many changes and modifications of the several features of the process described herein may be made without departing from the spirit and scope of the invention. It is, therefore, to be understood that the foregoing description is by way of illustration of the invention rather than limitation upon the invention.

I claim:

1. A process for controlling the melting point of hard and brittle fats within a relatively narrow range which comprises esterifying a mixture of fatty acids having from 10 to 18 carbon atoms with glycerine in a ratio of 0.425 to 0.475 mole of glycerine per average mole of fatty acid mixture to produce an ester product of minimum melting point having a hydroxyl number in the range of 40 to 100 and containing at least 90% of di- and triglycerides.

2. A process for controlling the melting point of hard and brittle fats within a relatively narrow range which comprises esterifying a mixture of fatty acids having from 10 to 18 carbon atoms with glycerine in a ratio of 0.425 to 0.475 mole of glycerine per average mole of fatty acid mixture to produce an ester product having a hydroxyl number in the range of 60 to 80 and containing at least 90% of di- and triglycerides.

(References on following page)

References Cited by the Examiner

UNITED STATES PATENTS

| | | | |
|---|---|---|---|
| 2,634,278 | 4/1953 | Khurt | 260—410.7 |
| 2,684,970 | 7/1954 | Imhausen et al. | 260—410.7 X |
| 2,745,749 | 5/1956 | Feuge et al. | 260—410.7 X |

FOREIGN PATENTS

| | | |
|---|---|---|
| 1,016,902 | 10/1957 | Germany. |
| 785,933 | 5/1954 | Great Britain. |

CHARLES B. PARKER, *Primary Examiner.*

DANIEL D. HORWITZ, JOSEPH P. BRUST, *Examiners.*

ANTON H. SUTTO, *Assistant Examiner.*